(12) United States Patent
Kashef et al.

(10) Patent No.: US 10,492,156 B2
(45) Date of Patent: Nov. 26, 2019

(54) DYNAMIC DIRECT MULTINODE (DDM) WIRELESS NETWORK

(71) Applicant: Libre Wireless Technologies Inc., Irvine, CA (US)

(72) Inventors: Hooman Kashef, Coto de Caza, CA (US); Hari Bojan, Bangalore (IN); Jordan Watters, Spicewood, TX (US)

(73) Assignee: INIZIO CAPITAL LLC, New York, NY (US)

( * ) Notice: Subject to any disclaimer, the term of this patent is extended or adjusted under 35 U.S.C. 154(b) by 49 days.

(21) Appl. No.: 15/332,188

(22) Filed: Oct. 24, 2016

(65) Prior Publication Data

US 2018/0063802 A1   Mar. 1, 2018

Related U.S. Application Data

(60) Provisional application No. 62/381,723, filed on Aug. 31, 2016.

(51) Int. Cl.
| | |
|---|---|
| *H04L 29/06* | (2006.01) |
| *H04W 56/00* | (2009.01) |
| *H04W 8/00* | (2009.01) |
| *H04R 27/00* | (2006.01) |
| *H04W 84/12* | (2009.01) |
| *H04W 4/80* | (2018.01) |

(52) U.S. Cl.
CPC ........... *H04W 56/001* (2013.01); *H04L 65/60* (2013.01); *H04R 27/00* (2013.01); *H04W 8/005* (2013.01); *H04R 2227/003* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | | |
|---|---|---|---|---|
| 9,888,337 | B1 * | 2/2018 | Zalewski | H04L 67/10 |
| 2013/0109314 | A1 * | 5/2013 | Kneckt | H04W 4/80 |
| | | | | 455/41.2 |
| 2013/0343566 | A1 * | 12/2013 | Triplett | H04N 21/23406 |
| | | | | 381/77 |
| 2016/0007288 | A1 * | 1/2016 | Samardzija | H04W 52/0229 |
| | | | | 370/311 |
| 2017/0086159 | A1 * | 3/2017 | Ameixiera | H04W 56/0025 |

\* cited by examiner

*Primary Examiner* — Nicholas Sloms
(74) *Attorney, Agent, or Firm* — Metis IP LLC

(57) ABSTRACT

There are disclosed herein implementations of a system providing a direct dynamic multinode (DDM) wireless network, and a method for use by the system. Such a system includes multiple nodes configured for wireless communication, at least one of the nodes being configured to receive external data from an external source. Each of the nodes is configured to discover other nodes of the DDM wireless network. Each of the nodes is also configured to run a time and phase tracking function to provide synchronization between the nodes, and to route control and data information directly to other nodes so as to synchronously output the external data.

19 Claims, 9 Drawing Sheets

DYNAMIC DIRECT MULTINODE (DDM) WIRELESS NETWORK

The present application claims the benefit of and priority to a provisional application titled "Multiple Wireless Node Connectivity and Network Topology," Ser. No. 62/381,723 filed on Aug. 31, 2016. The disclosure in this provisional application is hereby incorporated fully by reference into the present application.

BACKGROUND

Background Art

The use of local area networks including multiple wireless end points has become quite common, and continues to grow. Such wireless end points may be deployed in computing platforms, media receivers, medical devices, and industrial and home automation devices, for example, and may participate in what has become known as the Internet of Things (IoT).

The wireless end points implemented as part of a local network are typically connected to a local Access Point (AP), such as a router, for example. The AP provides connectivity and a communication infrastructure between the wireless end points and an external communication network, for example the Internet. In addition, in conventional network topologies, often referred to as "star networks," the AP providing the communication infrastructure typically performs the routing functions to establish communication links between different wireless end points.

However, conventional star network topologies do not offer an efficient infrastructure for communication between wireless endpoints. For example, use of the AP as an intermediary for communications between two wireless endpoints results in communication traffic being transmitted over the air twice, once from the sending end point to the AP, and once again from the AP to the receiving end point. Thus, wireless channel bandwidth utilization is reduced by a factor of two or more, thereby reducing the amount of data and the data rate that can be supported by the two end points and the AP. Consequently, conventional star networks may be inadequate for applications where network bandwidth, traffic delay, and jitter are critical parts of the application requirements.

SUMMARY

The present disclosure is directed to a dynamic direct multinode (DDM) wireless network, substantially as shown in and/or described in connection with at least one of the figures, and as set forth in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the use of local area networks including multiple wireless end points has become quite common, and continues to grow. Such wireless end points, or "nodes," may be deployed in computing platforms, media receivers, medical devices, and industrial and home automation devices, for example, and may participate in what has become known as the Internet of Things (IoT).

As further stated above, the wireless end points implemented as part of a local network are typically connected to a local Access Point (AP), such as a router, for example. The AP provides connectivity and a communication infrastructure between the wireless end points and an external communication network, for example the Internet. In addition, in conventional network topologies, often referred to as "star networks," the AP providing the communication infrastructure also typically performs the routing functions to establish communication links between different wireless end points.

Figure 1A:
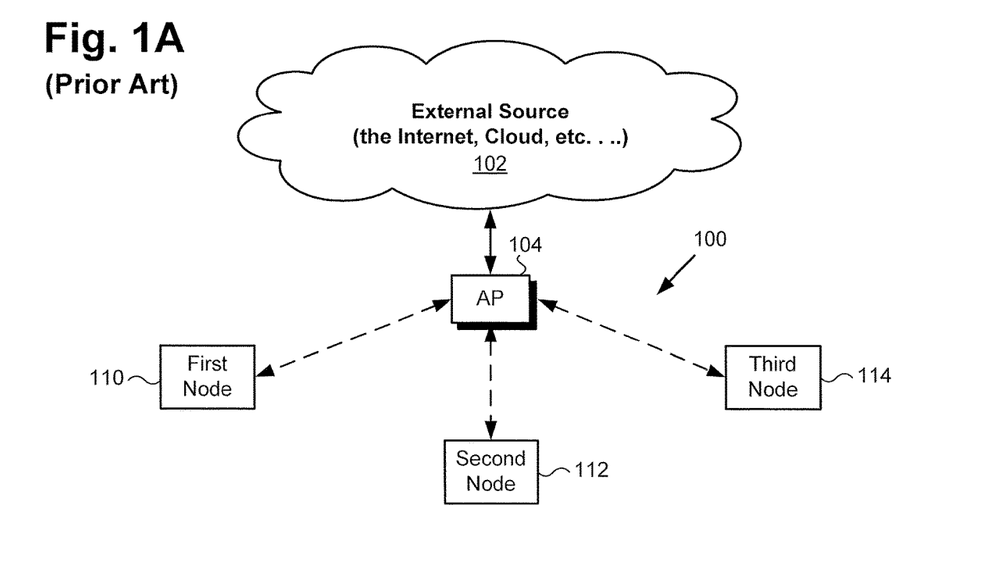
FIG. 1A shows a conventional star network topology.

FIG. 1A shows communication environment 100 employing a conventional star network topology. As shown in FIG. 1A, communication environment 100 includes external source 102, which may correspond to the Internet, or any public or private network of remote servers (hereinafter referred to as "the cloud"). Also shown in FIG. 1A is AP 104, as well as first wireless endpoint or node 110, second wireless endpoint or node 112, and third wireless endpoint or node 114 (hereinafter "first node 110," "second node 112," and "third node 114") in communication with external source 102 through AP 104.

In addition to communicating with external source 102 through AP 104, in some applications it may be advantageous or desirable for some or all of first node 110, second node 112, and third node 114 to be in communication with one another. In the conventional star network topology shown in FIG. 1A, AP 104 provides the communication infrastructure and the routing functions to establish communication links between different nodes, in addition to mediating communications to and from external source 102.

Figure 1B:
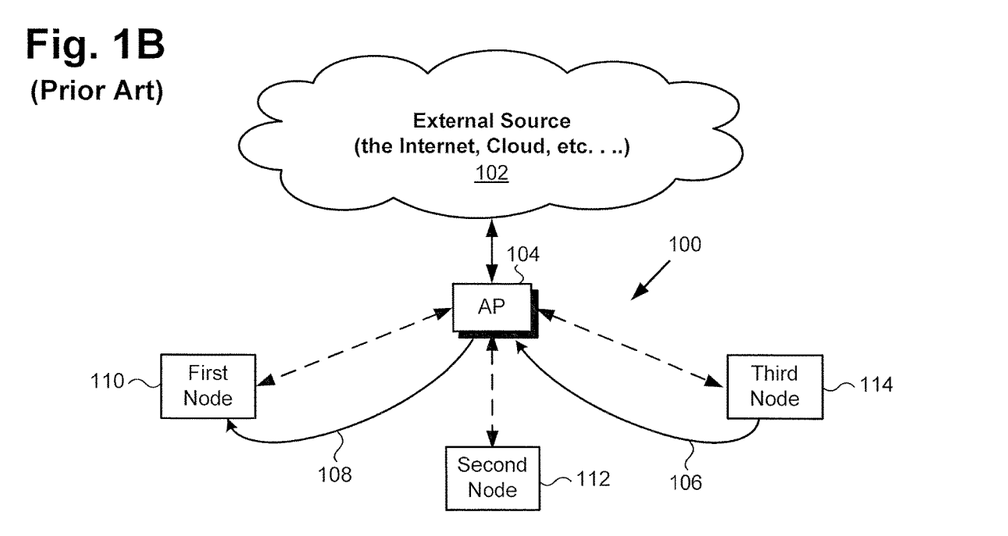
FIG. 1B shows inefficiencies associated with communications between wireless endpoints in the conventional star network of FIG. 1A.

FIG. 1B shows one example of the inefficiencies associated with communication between nodes in the conventional star network of FIG. 1A. As shown in FIG. 1B, two nodes (i.e., first node 110 and third node 114) are communicating with each other through AP 104. However, because the communication traffic from third node 114 to first node 110 must be routed through AP 104, that communication traffic is transmitted over the air twice, once as transmission 106 and a second time as transmission 108. In this simple exemplary case, the wireless channel bandwidth utilization is reduced by a factor of two or more, thereby reducing the amount of data and the data rate that can be supported by first node 110, third node 114, and AP 104.

In the conventional implementations shown in FIGS. 1A and 1B, AP 104 typically manages communication traffic between first node 110, second node 112, and third node 114 by queuing or buffering the incoming and outgoing data packets and scheduling packets for processing based on various factors, such as traffic priority for example. That management of communication traffic by AP 104 may introduce delays in the network traffic. Moreover, in many conventional implementations, AP 104 manages and processes the communication traffic between first node 110, second node 112, and third node 114 in software, and may thereby introduce variable delay or jitter in the traffic flow.

Thus, conventional star network topologies do not offer an efficient infrastructure for communication between nodes of a wireless network. As a result, conventional star networks may be inadequate for applications where network bandwidth, traffic delay, and jitter are critical parts of the application requirements. For example audio and video streaming applications over wireless networks require consistently low delay, latency, and jitter in network performance.

The present application discloses dynamic direct multinode (DDM) wireless networks in which node-to-node communication is achieved efficiently, using a substantially minimal amount of channel bandwidth, and resulting in significantly reduced network delay and jitter. The disclosed DDM wireless network architecture includes multiple DDM nodes, where each DDM node can discover and connect to other nodes in the network, and where connected DDM nodes are configured to route control and data information directly to each other.

It is noted that, as used in the present application, the term "dynamic direct multinode" and its acronym "DDM" define a wireless network that is "dynamic" and "multinode" because the number and functionality of multiple DDM nodes of the network can be altered dynamically. That is to say, DDM nodes may be added or removed from an existing DDM wireless network on the fly. In addition, a master node for a DDM wireless network may be any DDM node of the DDM wireless network. Also, the particular DDM node functioning as the master node may change dynamically in response to various factors, such as changes in the locations of one or more DDM nodes, a change in the location of an external source of external data, or switching to a different external source of external data, for example. Furthermore, the DDM network is "direct" because each DDM node is configured to communicate directly with other DDM nodes, without first routing such communications through an intermediary device, such as an AP.

The DDM wireless networks disclosed in the present application can function with or without a separate AP. That is to say, in some implementations, one or more DDM nodes of the DDM network may be configured as an access point or points for the DDM network. It is further noted that a DDM wireless network implemented according to the present principles may adopt any conventional network topology, such as Star or Direct, for example, as long as each node is configured to function as a DDM node.

Figure 2:
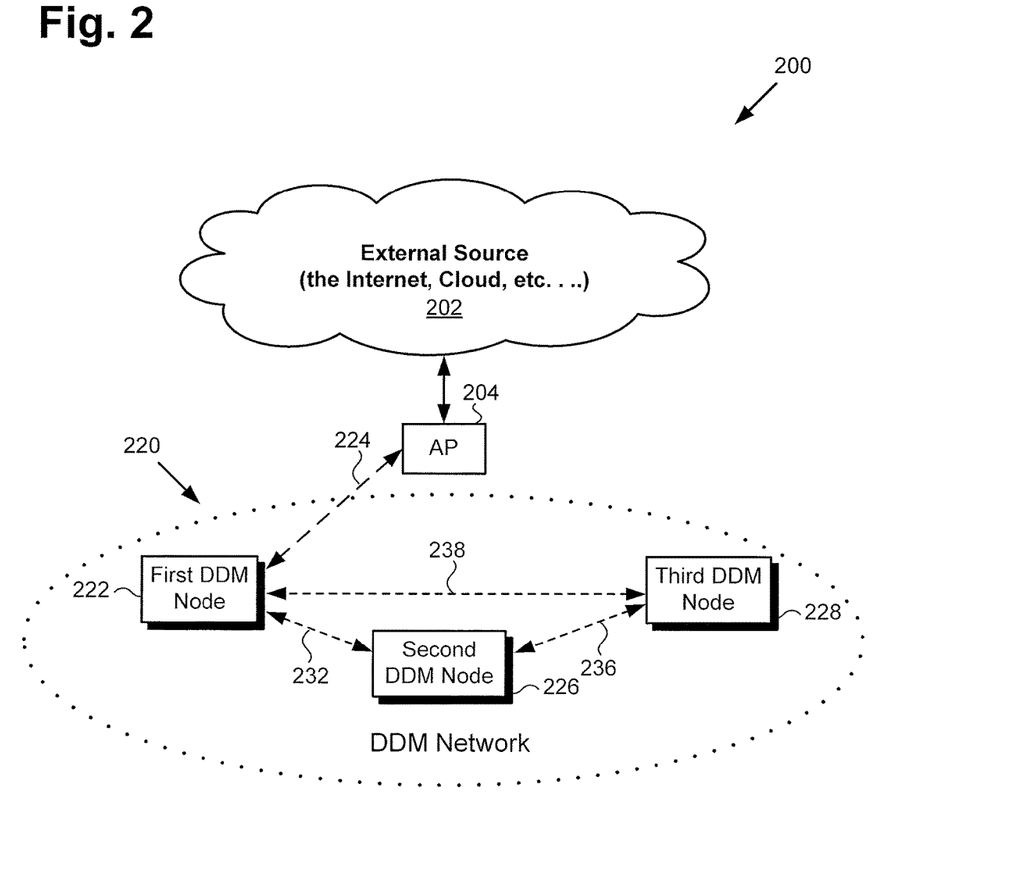
FIG. 2 shows an exemplary direct dynamic multinode (DDM) wireless network including multiple DDM nodes, according to one implementation.

FIG. 2 shows communication environment 200 including exemplary DDM wireless network 220, according to one implementation. It is noted that for the purposes of the present disclosure, the descriptive phrase "DDM wireless network" and the descriptive word "system" may be used interchangeably. In other words, the feature identified by reference number 220 may be alternatively referred to as "DDM wireless network 220" and "system 220."

As shown in FIG. 2, communication environment 200 includes external source 202, which may correspond to the Internet, or the cloud, for example, as described above. In addition, communication environment 200 includes AP 204, which may be a router including a wireless access point (WAP), for example. Communication environment 200 also includes DDM wireless network 220 having first DDM node 222, second DDM node 226, and third DDM node 228.

As also shown in FIG. 2, according to the present exemplary implementation, first DDM node 222 of DDM wireless network 220 is configured to receive external data 224 from external source 202 via AP 204. It is noted that although the exemplary implementation shown in FIG. 2 depicts first DDM node 222 as receiving external data 224, in other implementations, any one or more of first DDM node 222, second DDM node 226, and third DDM node 228 may be configured to receive external data 224. It is further noted that external data 224 may be received from external source 202 via a wireless connection with AP 204, or by wire from AP 204. Thus, external data 224 may be provided by external source 202, such as the Internet or a network of remote servers, for example, and may be further provided by AP 204.

First DDM node 222, second DDM node 226, and third DDM node 228 may be implemented as part of any of a variety of devices or systems. In some implementations, for example, each of first DDM node 222, second DDM node 226, and third DDM node 228 may be integrated with a substantially similar wireless device, such as an audio speaker, light emitting device, or accelerometer, for example. However, in other implementations, first DDM node 222, second DDM node 226, and third DDM node 228 may be integrated with different types of wireless devices included in DDM wireless network 220.

As a specific example, in one implementation, first DDM node 222 may be integrated into a home theater system including a video display and audio speakers, while second DDM node 226 may be integrated into a remote audio speaker for providing surround sound effects for the home theater. In that exemplary implementation, third DDM node 228 may be integrated into a haptic device configured to provide haptic effects corresponding to content being presented using the home theater system corresponding to first DDM nod 222 and/or the surround sound speaker corresponding to second DDM node 226.

Furthermore, although the implementation shown in FIG. 2 depicts DDM wireless network 220 as including three DDM nodes, that representation is provided merely for conceptual clarity. In practice, DDM wireless network 220 may include more, or many more, than three DDM nodes, such as tens or hundreds of DDM nodes. With respect to relative placement of DDM nodes such as first DDM node 222, second DDM node 226, and third DDM node 228, those DDM nodes may be situated relatively close to one another, or may be spaced apart from one another by many meters, such as up to one hundred meters, for example.

As further shown in FIG. 2, first DDM node 222, second DDM node 226, and third DDM node 228 are in direct wireless communication with one another. That is to say, first DDM node 222 is in communication with second DDM node 226 via direct wireless link 232, and is in communication with third DDM node 228 via direct wireless link 238, while second DDM node 226 and third DDM node 228 are in communication via direct wireless link 236. The wireless communication among first DDM node 222, second DDM node 226, and third DDM node 228 corresponding to direct wireless links 232, 236, and 238 may be performed using any suitable wireless communications methods. For example, the wireless communication among first DDM node 222, second DDM node 226, and third DDM node 228, may be performed via one or more of WiFi, Bluetooth, ZigBee, and 60 GHz wireless communications methods.

According to the implementation of DDM wireless network 220 shown in FIG. 2, first DDM node 222, second DDM node 226, and third DDM node 228 can communicate with each other directly, without the need for inter-node communication traffic to flow through AP 204. The direct wireless communication among first DDM node 222, second DDM node 226, and third DDM node 228 provided by direct wireless links 232, 236, and 238 advantageously enables establishment of a consistent, accurate, and efficient network connectivity. As a result, DDM wireless network 220 conserves network capacity, and reduces network traffic load, buffering, delay, and jitter when compared to conventional wireless network architectures in which inter-node communication traffic passes through AP 204.

In some applications, such as network media and audio streaming applications, for example, the network nodes need to operate on substantially the same time-base relative to each other and with very accurate timing control and timing resolution. Thus, in some implementations of DDM wireless network 220, one of the DDM nodes, such as first DDM node 222, for example, can function as a master node providing timing and/or phase synchronization. For example, a master node corresponding to first DDM node 222 may track and take into account the overall network delay and jitter, and may run a closed loop time and phase lock tracking function to provide synchronization between first DDM node 222, second DDM node 226, and third DDM node 228. Moreover, in some implementations, first DDM node 222, second DDM node 226, and third DDM node 228 may collectively run a closed loop distributed time and phase lock tracking function to provide synchronization between first DDM node 222, second DDM node 226, and third DDM node 228.

Figure 3:
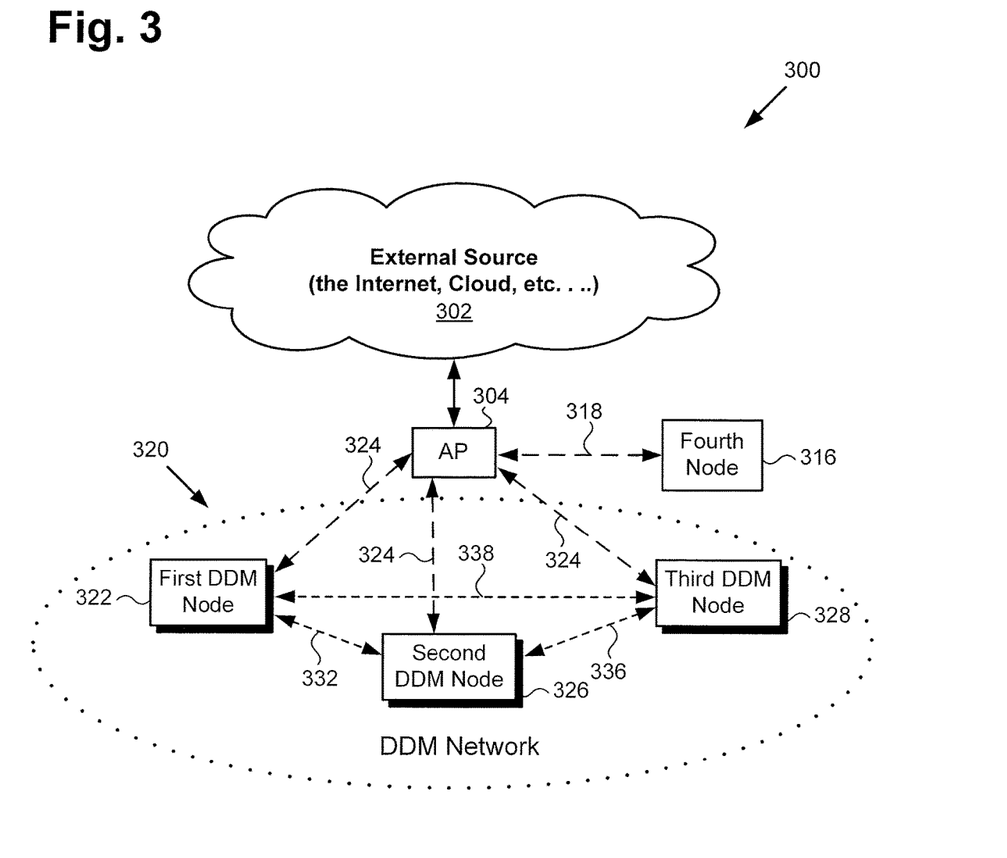
FIG. 3 shows an exemplary DDM wireless network including multiple DDM nodes, according to another implementation.

FIG. 3 shows communication environment 300 including exemplary DDM wireless network 320, according to another implementation. As shown in FIG. 3, communication environment 300 includes external source 302, which may correspond to the Internet, or the cloud, for example, as described above. In addition, communication environment 300 includes AP 304, which may be a router including a WAP, for example. Communication environment 300 further includes DDM wireless network 320 having first DDM node 322, second DDM node 326, and third DDM node 328 in direct wireless communication with one another via direct wireless links 332, 336, and 338. Also shown in FIG. 3 is external data 324 received by DDM wireless network 320 through AP 304, and fourth node 316 interactively coupled to AP 304 by communication link 318.

DDM wireless network 320 receiving external data 324 corresponds in general to DDM wireless network 220 receiving external data 224, in FIG. 2, and may share any of the characteristics attributed to that corresponding feature in the present application. In other words, first DDM node 322, second DDM node 326, third DDM node 328, and direct wireless links 332, 336, and 338, in FIG. 3, correspond respectively in general to first DDM node 222, second DDM node 226, third DDM node 228, and direct wireless links 232, 236, and 238, in FIG. 2, and may share any of the characteristics attributed to those corresponding features in the present application.

As shown in FIG. 3, however, communication environment 300 includes fourth node 316, which is a non-DDM node in communication with DDM wireless network 320 through communication link 318 and AP 304. It is noted that communication link 318 between non-DDM fourth node 316 and AP 304 may be a wireless communication link or a wire link. According to the exemplary implementation shown in FIG. 3, external data 324 can include data received from external source 302 and/or data received from non-DDM fourth node 316. In other words, external data 324, in FIG. 3, may be provided by external source 302, such as the Internet or a network of remote servers, for example, and/or non-DDM fourth node 316, and may be further provided by AP 304.

Consequently, and as shown in FIG. 3, first DDM node 322, second DDM node 326, and third DDM node 28 may be in communication with one another through direct wireless links 332, 336, and 338, and may be further connected to external source 302 and/or non-DDM fourth node 316 through AP 304. Thus, each of first DDM node 322, second DDM node 326, and third DDM node 328 of DDM wireless network 320 can be configured to maintain multiple different connections and to interoperate and communicate with other nodes which do not support DDM capabilities, such as non-DDM fourth node 316.

Furthermore, despite relying on AP 304 to mediate communications with non-DDM fourth node 316, first DDM node 322, second DDM node 326, and third DDM node 328 can communicate with each other directly, without the need for inter-node communication traffic within DDM wireless network 320 to flow through AP 304. As discussed above by reference to FIG. 2, the direct wireless communication among first DDM node 322, second DDM node 326, and third DDM node 328 provided by direct wireless links 332, 336, and 338 advantageously enables establishment of a consistent, accurate, and efficient network connectivity. As a result, DDM wireless network 320 conserves network capacity, and reduces network traffic load, buffering, delay, and jitter when compared to conventional wireless network architectures in which inter-node communication traffic passes exclusively through AP 304.

Figure 4:
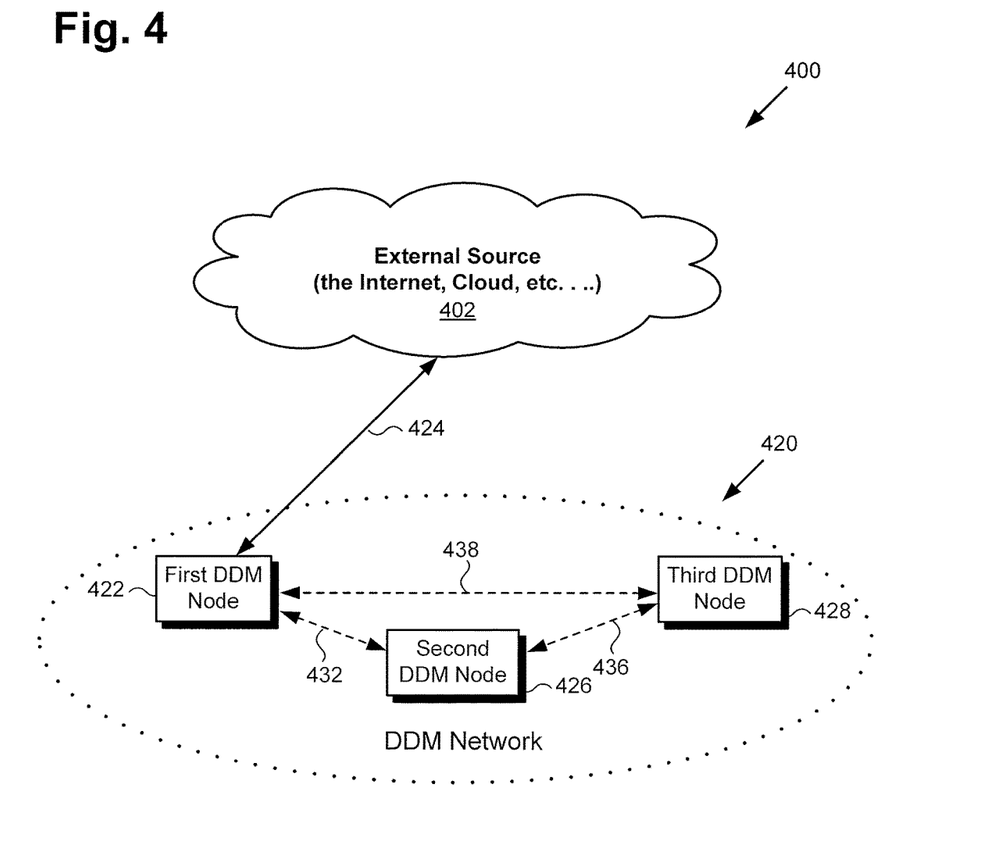
FIG. 4 shows an exemplary DDM wireless network including a DDM node serving as an access point (AP) for the DDM wireless network, according to one implementation.

FIG. 4 shows communication environment 400 including exemplary DDM wireless network 420 having first DDM node 422 serving as the AP for the DDM wireless network, according to one implementation. As shown in 4, communication environment 400 includes external source 402, which may correspond to the Internet, or the cloud, for example, as described above. In addition, communication environment 400 includes DDM wireless network 420 having first DDM node 422, second DDM node 426, and third DDM node 428 in direct wireless communication with one another via direct wireless links 432, 436, and 438. Also shown in FIG. 4 is external data 424 received by DDM wireless network 420.

DDM wireless network 420 receiving external data 424 corresponds in general to DDM wireless network 220 receiving external data 224, in FIG. 2, and may share any of the characteristics attributed to that corresponding feature in the present application. In other words, first DDM node 422, second DDM node 426, third DDM node 428, and direct wireless links 432, 436, and 438, in FIG. 4, correspond respectively in general to first DDM node 222, second DDM node 226, third DDM node 228, and direct wireless links 232, 236, and 238, in FIG. 2, and may share any of the characteristics attributed to those corresponding features in the present application. In addition, external data 424, in FIG. 4, corresponds in general to external data 224, in FIG. 2, and may correspondingly be provided by external source 402, such as the Internet or a network of remote servers, for example.

It is noted that although the exemplary implementation shown in FIG. 4 depicts first DDM node 422 as serving as the AP for DDM wireless network 420, in other implementations, any one or more of first DDM node 422, second DDM node 426, and third DDM node 428 may be configured to serve as an AP for DDM wireless network 420. That is to say, any or all of first DDM node 422, second DDM node 426, and third DDM node 428 may be configured as a router for DDM wireless network 420.

Furthermore, in some implementations of DDM wireless network 420 one of first DDM node 422, second DDM node 426, and third DDM node 428 can function as a master node providing timing and/or phase synchronization. For example, one of first DDM node 422, second DDM node 426, and third DDM node 428 may track and take into account the overall network delay and jitter, and may run a closed loop time and phase lock tracking function to provide synchronization between first DDM node 422, second DDM node 426, and third DDM node 428. Alternatively, in some implementations, first DDM node 422, second DDM node 426, and third DDM node 428 may collectively run a closed loop distributed time and phase lock tracking function to provide synchronization between first DDM node 422, second DDM node 426, and third DDM node 428.

Figure 5:
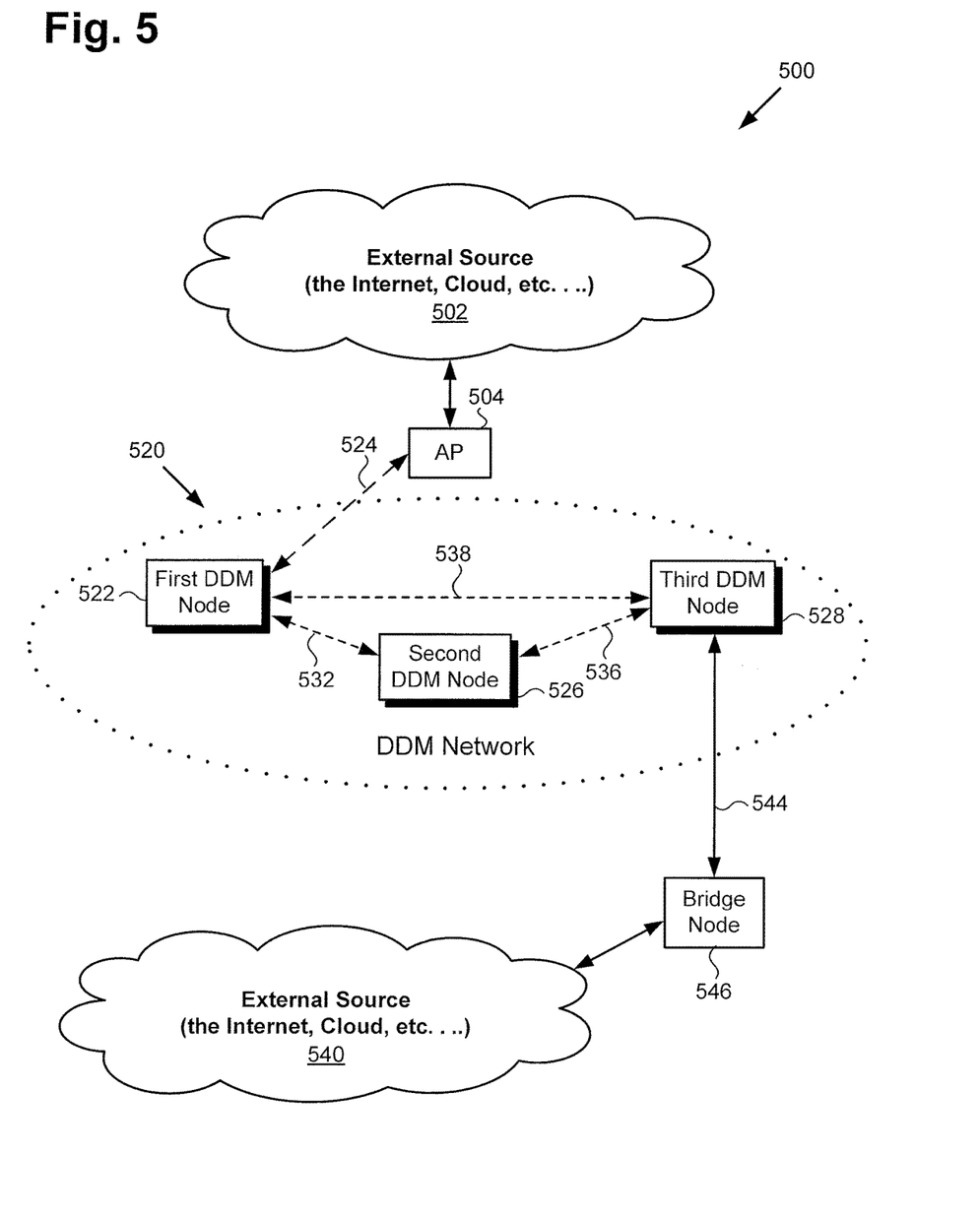
FIG. 5 shows an exemplary DDM wireless network linked to multiple external sources, according to one implementation.

FIG. 5 shows communication environment 500 including exemplary DDM wireless network 520 linked to multiple external sources, according to one implementation. As shown in FIG. 5, communication environment 500 includes external source 502, which may correspond to the Internet, or the cloud, for example, as described above. In addition, communication environment 500 includes AP 504, which may be a router including a WAP, for example. Communication environment 500 further includes DDM wireless network 520 having first DDM node 522, second DDM node 526, and third DDM node 528 in direct wireless communication with one another via direct wireless links 532, 536, and 538. Also shown in FIG. 5 is external data 524 received by DDM wireless network 520 through AP 504, external source 540, bridge node 546, and communication link 544 connecting bridge node 546 to DDM wireless network 520.

DDM wireless network 520 corresponds in general to DDM wireless network 220, in FIG. 2, and may share any of the characteristics attributed to that corresponding feature in the present application. In other words, first DDM node 522, second DDM node 526, third DDM node 528, and direct wireless links 532, 536, and 538, in FIG. 5, correspond respectively in general to first DDM node 222, second DDM node 226, third DDM node 228, and direct wireless links 232, 236, and 238, in FIG. 2, and may share any of the characteristics attributed to those corresponding features in the present application. In addition, external data 524, in FIG. 5, corresponds in general to external data 224, in FIG. 2, and may correspondingly be provided by external source 502, such as the Internet or a network of remote servers, for example and may further be provided by AP 504.

According to the implementation shown in FIG. 5, third DDM node 528 connects to and interfaces with bridge node 546, which may be a non-DDM node that does not support DDM functionality, via communication link 544. For example, non-DDM bridge node 546 may be a networking node or a computing or mobile platform, or, as shown in FIG. 5, may act as a communication bridge between DDM wireless network 520 and external source 540, which may be a provider of cloud services, for example. Communication link 544 providing the bridging interface between DDM wireless network 520 and bridge node 546 may be a wireless communication link, or may be a wire link. When provided as a wire link, communication link 544 may take the form of a Universal Serial Bus (USB) or Universal Asynchronous Receiver/Transmitter (UART) link, for example. When provided as a wireless link, communication link 544 may be provided using any of WiFi, Bluetooth, ZigBee, and 60 GHz wireless communications methods, for example.

Thus, according to the implementation shown in FIG. 5, first DDM node 522, second DDM node 526, and third DDM node 528 of DDM wireless network 520 can be configured to maintain multiple connections to multiple networks. Consequently, first DDM node 522, second DDM node 526, and third DDM node 528 of DDM wireless network 520 can advantageously be present on multiple networks offering a wide range of capabilities, concurrently, as well as interoperate and communicate with other nodes which do not support DDM capabilities, such as bridge node 546.

Figure 6:
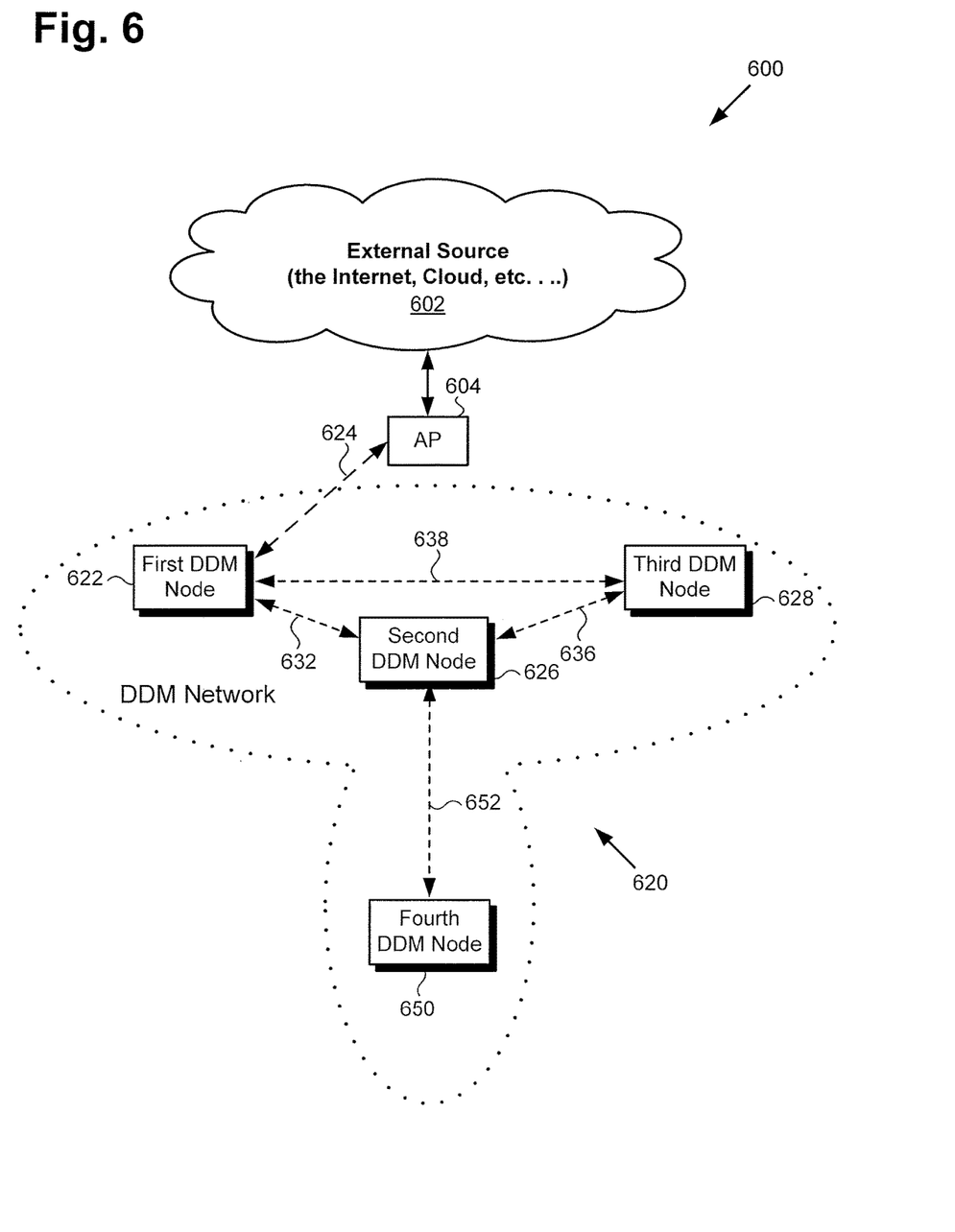
FIG. 6 shows an exemplary DDM wireless network including a DDM node serving as a repeater for another, remote, DDM node, according to one implementation.

FIG. 6 shows communication environment 600 including exemplary DDM wireless network 620 having a DDM node serving as a repeater for another, remote, DDM node, according to one implementation. As shown in FIG. 6, communication environment 600 includes external source 602, which may correspond to the Internet, or the cloud, for example, as described above. In addition, communication environment 600 includes AP 604, which may be a router including a WAP, for example. Communication environment 600 further includes DDM wireless network 620 having first DDM node 622, second DDM node 626, and third DDM node 628 in direct wireless communication with one another via direct wireless links 632, 636, and 638. Also shown in FIG. 6 is fourth DDM node 650, which is remote from first DDM node 622 and third DDM node 628, but is in wireless communication with second DDM node 626 via direct wireless link 652.

DDM wireless network 620 receiving external data 624 corresponds in general to DDM wireless network 220 receiving external data 224, in FIG. 2, and may share any of the characteristics attributed to that corresponding feature in the present application. In other words, first DDM node 622, second DDM node 626, third DDM node 628, and direct wireless links 632, 636, and 638, in FIG. 6, correspond respectively in general to first DDM node 222, second DDM node 226, third DDM node 228, and direct wireless links 232, 236, and 238, in FIG. 2, and may share any of the characteristics attributed to those corresponding features in the present application. In addition, fourth DDM node 650 and direct wireless link 652, in FIG. 6, correspond respectively in general to any of DDM nodes 222/226/228 and direct wireless links 232/236/238, in FIG. 2, and may share any of the characteristics attributed to those corresponding features in the present application. Moreover, external data 624, in FIG. 6, corresponds in general to external data 224, in FIG. 2, and may correspondingly be provided by external source 602, such as the Internet or a network of remote servers, for example, and may further be provided by AP 604.

As shown in FIG. 6, communication environment 600 includes fourth DDM node 650, which is sufficiently remote from first DDM node 622 and third DDM node 628 not to be discoverable by first DDM node 622 and third DDM node 628. However, according to the implementation shown in FIG. 6, fourth DDM node 650 is discoverable by second DDM node 626, and can consequently communicate with all of first DDM node 622, second DDM node 626, and third DDM node 628 via direct wireless link 652 with second DDM node 626. In other words, and as shown by FIG. 6, second DDM node 626 functions as a repeater for remote fourth DDM node 650, thereby advantageously expanding the reach of DDM wireless network 620.

Figure 7:
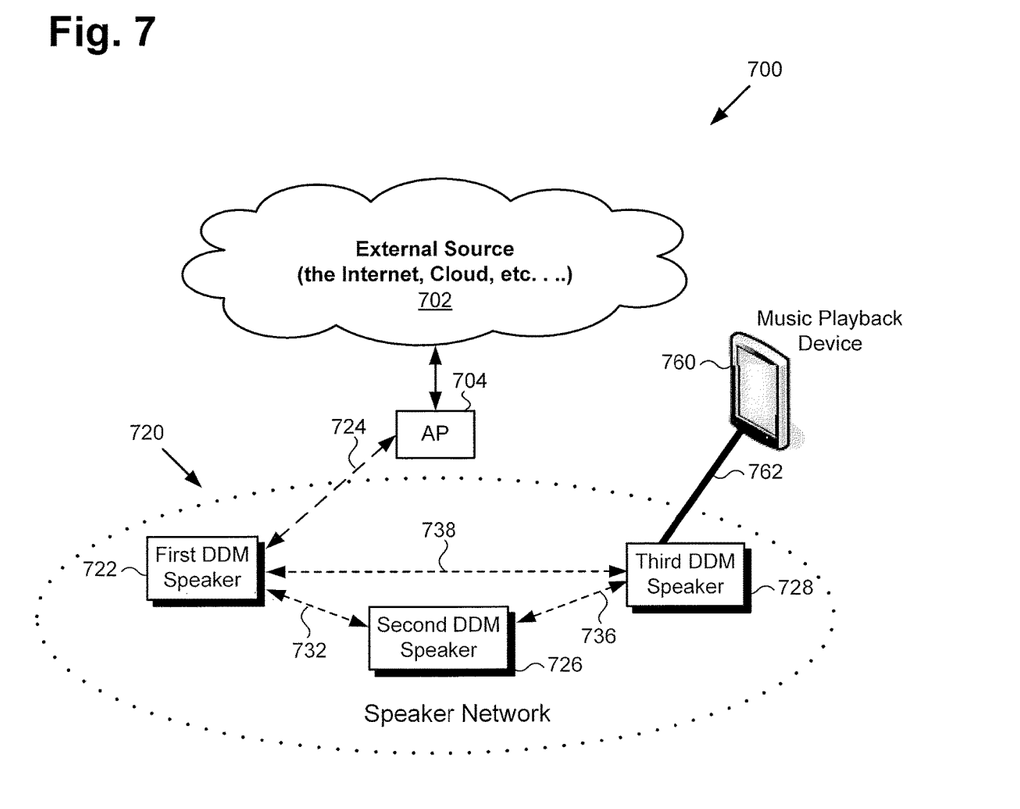
FIG. 7 shows an exemplary DDM network of wireless audio speakers receiving external data provided by wire from a music playback device, according to one implementation.

FIG. 7 shows communication environment 700 including exemplary DDM network 720 of wireless audio speakers receiving external data provided by wire from a music playback device, according to one implementation. As shown in FIG. 7, communication environment 700 includes external source 702, which may correspond to the Internet, or the cloud, for example, as described above. In addition, communication environment 700 includes AP 704, which may be a router including a WAP, for example. Communication environment 700 further includes DDM wireless speaker network 720 having first DDM wireless audio speaker 722, second DDM wireless audio speaker 726, and third DDM wireless audio speaker 728 in direct wireless communication with one another via direct wireless links 732, 736, and 738. Also shown in FIG. 7 is external data 724 received by DDM wireless speaker network 720 through AP 704, and an external source in the form of music playback device 760 providing external data 762 by wire to DDM wireless speaker network 720.

DDM wireless speaker network 720 corresponds in general to DDM wireless network 220, in FIG. 2, and may share any of the characteristics attributed to that corresponding feature in the present application. In other words, first DDM wireless audio speaker 722, second DDM wireless audio speaker 726, third DDM wireless audio speaker 728, and direct wireless links 732, 736, and 738, in FIG. 7, correspond respectively in general to first DDM node 222, second DDM node 226, third DDM node 228, and direct wireless links 232, 236, and 238, in FIG. 2, and may share any of the characteristics attributed to those corresponding features in the present application. In addition, external data 724, in FIG. 7, corresponds in general to external data 224, in FIG. 2, and may correspondingly be provided by external source 702, such as the Internet or a network of remote servers, for example, and may further be provided by AP 704.

As shown in FIG. 7, communication environment 700 also includes music playback device 760 providing external data 762, such as music data, to third DDM wireless audio speaker 728 by wire. It is noted that music playback device 760 may be any device capable of storing and playing back, and/or streaming, music. For example, music playback device 760 may be a digital music player, such as an MP3 player, a tablet computer, a smartphone, or any other device or system typically used to playback music. It is further noted that although the exemplary implementation shown in FIG. 7 depicts third DDM wireless audio speaker 728 as receiving external data 762 by wire, in other implementations, any of first DDM wireless audio speaker 722, second DDM wireless audio speaker 726, and third DDM wireless audio speaker 728 may receive external data 762 by wire from music playback device 760.

According to the implementation of DDM wireless speaker network 720 shown in FIG. 7, first DDM wireless audio speaker 722, second DDM wireless audio speaker 726, and third DDM wireless audio speaker 728 can communicate with each other directly, without the need for inter-node communication traffic to flow through AP 704. The direct wireless communication among first DDM wireless audio speaker 722, second DDM wireless audio speaker 726, and third DDM wireless audio speaker 728 provided by direct wireless links 732, 736, and 738 advantageously enables establishment of a consistent, accurate, and efficient network connectivity. As a result, DDM wireless speaker network 720 conserves network capacity, and reduces network traffic load, buffering, delay, and jitter, which may be especially important for a network of wirelessly connected audio speakers.

As noted above, in network media and audio streaming applications, for example, the network nodes need to operate on substantially the same time-base relative to each other and with very accurate timing control and timing resolution. Thus, in some implementations of DDM wireless speaker network 720, one of the DDM nodes, such as third DDM wireless audio speaker 728, for example, can function as a master node providing timing and/or phase synchronization.

For example, a master node corresponding to third DDM wireless audio speaker 728 may track and take into account the overall network delay and jitter, and may run a closed loop time and phase lock tracking function to provide synchronization between first DDM wireless audio speaker 722, second DDM wireless audio speaker 726, and third DDM wireless audio speaker 728. Moreover, in some implementations, first DDM wireless audio speaker 722, second DDM wireless audio speaker 726, and third DDM wireless audio speaker 728 may collectively run a closed loop distributed time and phase lock tracking function to provide synchronization between first DDM wireless audio speaker 722, second DDM wireless audio speaker 726, and third DDM wireless audio speaker 728. As a result, first DDM wireless audio speaker 722, second DDM wireless audio speaker 726, and third DDM wireless audio speaker 728 can synchronously output external music data 762 received by DDM wireless speaker network 720 from music playback device 760.

Figure 8:
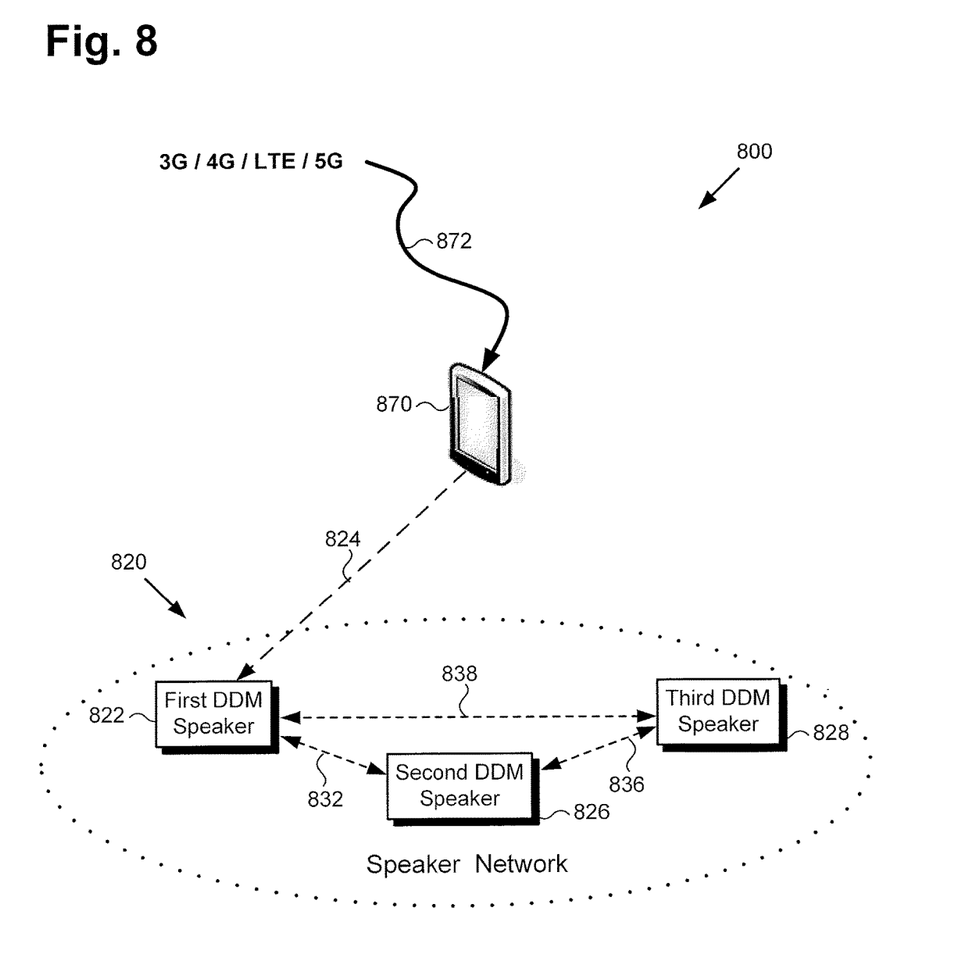
FIG. 8 shows an exemplary DDM network of wireless audio speakers receiving external data provided by a mobile device in communication with a cellular data network, according to one implementation.

FIG. 8 shows communication environment 800 including exemplary DDM network 820 of wireless audio speakers receiving external data provided by a mobile device in communication with a cellular data network, according to one implementation. As shown in FIG. 8, communication environment 800 includes external source 870, which in the present implementation may take the form of a smartphone or other mobile communication device. In addition, communication environment 800 includes DDM wireless speaker network 820 having first DDM wireless audio speaker 822, second DDM wireless audio speaker 826, and third DDM wireless audio speaker 828 in direct wireless communication with one another via direct wireless links 832, 836, and 838. Also shown in FIG. 8 are external data 824 received by DDM wireless speaker network 820 from external source 870 and cellular data network link 872.

DDM wireless speaker network 820 corresponds in general to DDM wireless network 220, in FIG. 2, and may share any of the characteristics attributed to that corresponding feature in the present application. In other words, first DDM wireless audio speaker 822, second DDM wireless audio speaker 826, third DDM wireless audio speaker 828, and direct wireless links 832, 836, and 838, in FIG. 8, correspond respectively in general to first DDM node 222, second DDM node 226, third DDM node 228, and direct wireless links 232, 236, and 238, in FIG. 2, and may share any of the characteristics attributed to those corresponding features in the present application.

As shown in FIG. 8, external source 870 provides external data 824, such as music data, to first DDM wireless audio speaker 822. External data 824 may be received from external source 870 via a wireless connection with external source 870, or by wire from external source 870. It is noted that external source 870 may be any device capable of receiving data over a cellular data network, such as a 3G, 4G, LTE, or 5G network, for example. In other words, external source 870 may be a tablet computer, a smartphone, or any other device or system typically used to receive data over a cellular data network link such as cellular data network link 872. It is further noted that although the exemplary implementation shown in FIG. 8 depicts first DDM wireless audio speaker 822 as receiving external data 824, in other implementations, any of first DDM wireless audio speaker 822, second DDM wireless audio speaker 826, and third DDM wireless audio speaker 828 may receive external data 824 from external source 870.

According to the implementation of DDM wireless speaker network 820 shown in FIG. 8, first DDM wireless audio speaker 822, second DDM wireless audio speaker 826, and third DDM wireless audio speaker 828 can communicate with each other directly, via direct wireless links 832, 836, and 838. That direct wireless communication advantageously enables establishment of a consistent, accurate, and efficient network connectivity. As a result, DDM wireless speaker network 820 conserves network capacity, and reduces network traffic load, buffering, delay, and jitter, which may be especially important for a network of wirelessly connected audio speakers.

As noted above, in network media and audio streaming applications, for example, the network nodes need to operate on substantially the same time-base relative to each other and with very accurate timing control and timing resolution. Thus, in some implementations of DDM wireless speaker network 820, one of the DDM nodes, such as first DDM wireless audio speaker 822, for example, can function as a master node providing timing and/or phase synchronization.

For example, a master node corresponding to first DDM wireless audio speaker 822 may track and take into account the overall network delay and jitter, and may run a closed loop time and phase lock tracking function to provide synchronization between first DDM wireless audio speaker 822, second DDM wireless audio speaker 826, and third DDM wireless audio speaker 828. Moreover, in some implementations, first DDM wireless audio speaker 822, second DDM wireless audio speaker 826, and third DDM wireless audio speaker 828 may collectively run a closed loop distributed time and phase lock tracking function to provide synchronization between first DDM wireless audio speaker 822, second DDM wireless audio speaker 826, and third DDM wireless audio speaker 828. As a result, first DDM wireless audio speaker 822, second DDM wireless audio speaker 826, and third DDM wireless audio speaker 828 can synchronously output external data 824 received by DDM wireless speaker network 820 from external source 870.

One advantage of the implementation shown in FIG. 8 is that DDM wireless speaker network 820 can be used in conjunction with external source 870 to provide a highly synchronized mobile sound system for playing music in the outdoors. For example, wireless speaker network 820 may correspond to multiple high fidelity speakers situated in a home garden or patio area, or in a public space such as a park or beach. Provided only that external device 870 is able to receive music data via cellular data network link 872, that music data can be streamed to DDM wireless speaker network 820 as external data 824, and can be synchronously played out using first DDM wireless audio speaker 822, second DDM wireless audio speaker 826, and third DDM wireless audio speaker 828.

Figure 9:
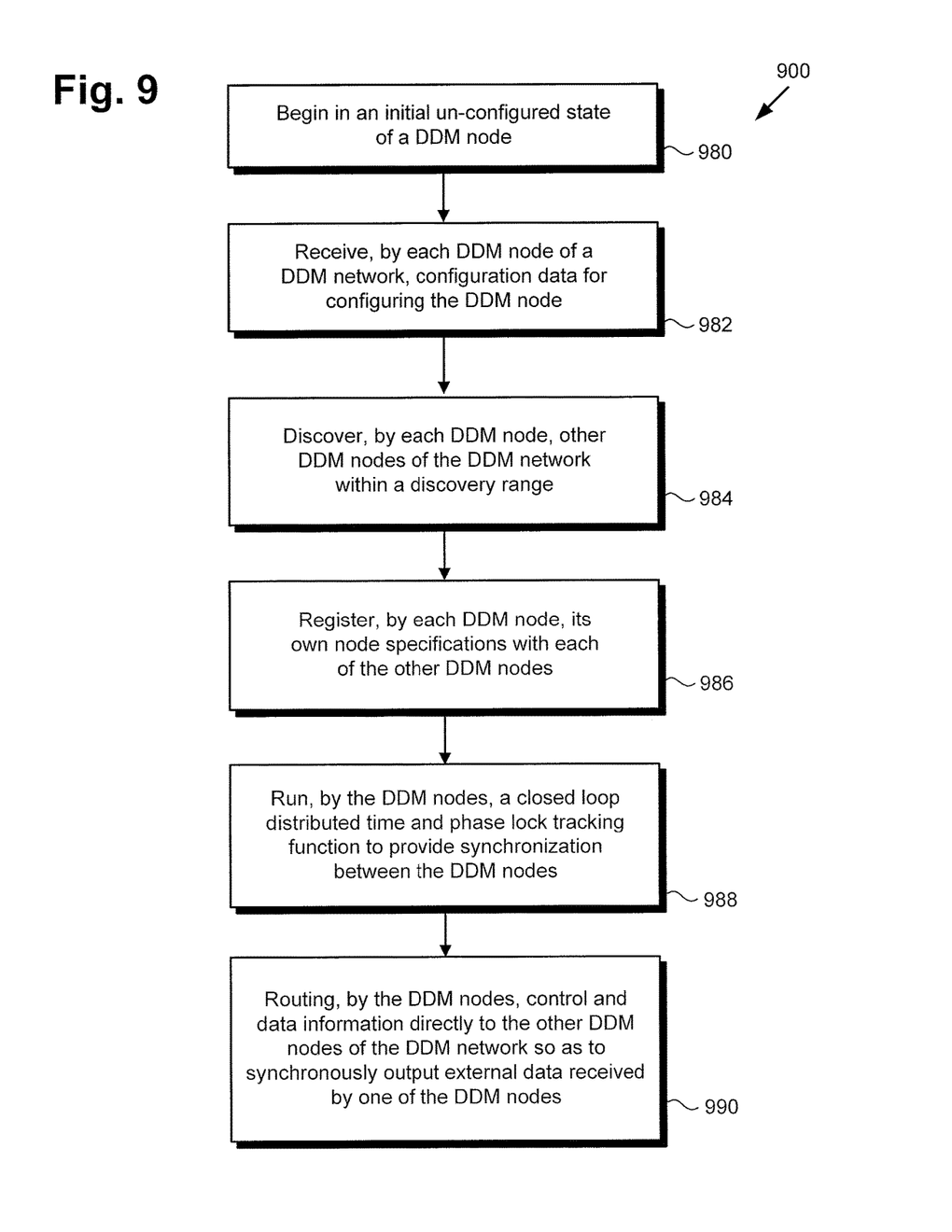
FIG. 9 shows a flowchart presenting an exemplary method for use by a wireless network of DDM nodes to communication directly with one another.

FIG. 9 shows flowchart 900 presenting an exemplary method for use by a wireless network of DDM nodes to communication directly with one another. It is noted that certain details and features have been left out of flowchart 900 that are apparent to a person of ordinary skill in the art, in order not to obscure the discussion of the inventive features in the present application. It is further noted that although the actions outlined in flowchart 900 are described below by reference to the specific implementations shown in FIG. 2, the present method may be performed by any of the DDM nodes shown in FIGS. 2, 3, 4, 5, 6, 7, and 8.

Referring to FIG. 9 in conjunction with the exemplary DDM wireless network implementation shown in FIG. 2, flowchart 900 starts with first DDM node 222, second DDM node 226, and third DDM node 228 beginning in an initial unconfigured state (action 980). The unconfigured state may be an initial state of first DDM node 222, second DDM node 226, and third DDM node 228 after power up for the very first time. The unconfigured state may also correspond to a "Factory Boot State," of first DDM node 222, second DDM node 226, and third DDM node 228. It is noted that first DDM node 222, second DDM node 226, and third DDM node 228 remain in the unconfigured state until they are configured.

Flowchart 900 continues with receiving, by each of first DDM node 222, second DDM node 226, and third DDM node 228 of DDM wireless network 220, configuration data for configuring each of the DDM nodes (action 982). Configuration data may be received by first DDM node 222, second DDM node 226, and third DDM node 228 over a wireless connection, or by wire. When provided by wire, for example, the configuration data may be received via a USB, UART, Ethernet, or Serial Peripheral Interface (SPI) link, for example. When provided wirelessly, the configuration data may be received via WiFi (e.g., SoftAp or Direct Connect), Bluetooth, ZigBee, Near-field communication (NFC), or 60 GHz wireless communications methods, for example.

In the configured state, first DDM node 222, second DDM node 226, and third DDM node 228 can maintain network connectivity at layer 2 and/or layer 3 of the Open Systems Interconnection (OSI) model, i.e., at media access control (MAC) sublayer of data link layer 2 and/or via Packet/IP at network layer 3. For example, where AP 204 is a WiFi AP, first DDM node 222, second DDM node 226, and third DDM node 228 would be associated and connected with WiFi AP 204, including using a secure encrypted connection such as WiFi Protected Access (WPA), WPA2, Temporal Key Integrity Protocol (TKIP), and the like.

Once first DDM node 222, second DDM node 226, and third DDM node 228 are configured, each of first DDM node 222, second DDM node 226, and third DDM node 228 may operate independently for its intended function. For example in a network/WiFi speaker application, any of first DDM node 222, second DDM node 226, and third DDM node 228 may function as a standalone network speaker in the configured state. In this state, each of first DDM node 222, second DDM node 226, and third DDM node 228 remains connected to WiFi AP 204 and can also act as a master node for first DDM node 222, second DDM node 226, and third DDM node 228 using via direct wireless links 232, 236, and 238.

Flowchart 900 continues with discovering, by each of first DDM node 222, second DDM node 226, and third DDM node 228, other nodes of DDM wireless network 220 within a discovery range (action 984). In some implementations, once first DDM node 222, second DDM node 226, and third DDM node 228 are in the configured state, each node continuously looks to discover other DDM nodes.

Multiple discovery protocols may be used for DDM nodes to discover each other. As non-exhaustive examples, the discovery protocols may include Tunneled Direct Link Setup (TDLS), WiFi Direct peer-to-peer (P2P), Universal Plug and Play (UpnP), Bonjour, or other mechanisms for two or more DDM nodes to discover each other over a wired or wireless network. The discovery protocols may be communicated through AP 204 or via direct wireless links 232, 236, and 238, which may be WiFi-Direct links, for example. Once first DDM node 222, second DDM node 226, and third DDM node 228 discover one another, they may maintain connection through AP 204 and/or via direct wireless links 232, 236, and 238.

Flowchart 900 continues with registering, by each of first DDM node 222, second DDM node 226, and third DDM node 228, its own node specifications with others of first DDM node 222, second DDM node 226, and third DDM node 228 (action 986). After the discovery process, first DDM node 222, second DDM node 226, and third DDM node 228 register their capabilities and services (i.e., node specifications) to all other discovered DDM nodes.

It is noted that any of first DDM node 222, second DDM node 226, and third DDM node 228 may at any time de-register their capabilities or services autonomously or triggered by a network or host controller. Moreover, each of first DDM node 222, second DDM node 226, and third DDM node 228 may register and de-register all or part of its node specifications based on a security or authentication level which is mutually understood by all DDM nodes. It is further noted that, in some implementations, one DDM node may register different node specifications with different DDM nodes depending on the authentication level confirmed by the discovered DDM nodes.

In some implementations, in addition to registering its own node specifications with other DDM nodes, each of first DDM node 222, second DDM node 226, and third DDM node 228 may be configured to initiate or transfer control commands to other DDM nodes. The transport control protocol used by first DDM node 222, second DDM node 226, and third DDM node 228 may be secure or unsecured and may or may not require acknowledgments depending on the control commands. The transport control protocol and commands may be communicated between first DDM node 222, second DDM node 226, and third DDM node 228 via AP 204 or via direct wireless links 232, 236, and 238. Examples of commands that may be initiated or transferred include: Get Data, Set Data, Modify Data, Acknowledgement, Call Back, Event Trigger, Tmer Trigger, File Transfer (upload or download), Sleep, and Wakeup, to name a few. Through registration action 986 or a subsequent de-registration, DDM nodes can join or exit networks based on a user's preferences or commands. For example, an audio speaker in room one in a house can join a network of audio speakers in room two, and can later exit the network of audio speakers in room two, and join a network of speakers in room three by de-registering from the room two network and registering in the room three network.

Flowchart 900 continues with running, by first DDM node 222, second DDM node 226, and third DDM node 228, a time and phase tracking function to provide synchronization between first DDM node 222, second DDM node 226, and third DDM node 228 (action 988). In some applications, first DDM node 222, second DDM node 226, and third DDM node 228 may be required to maintain an accurate time base relative to each other and/or relative to an absolute time reference (e.g., world clock). One such application is in real-time streaming of audio between multiple DDM speakers. In this case, all DDM nodes which are required to be in time synchronization with each other run a closed loop distributed time and phase lock tracking function.

There are several methods and protocols for maintaining accurate time and phase synchronization between first DDM node 222, second DDM node 226, and third DDM node 228, and DDM wireless network 220 may utilized one or several of such methods or protocols depending on the application requirements. Time and phase synchronization protocols may operate through the AP infrastructure network provided by AP 204 or over direct wireless links 232, 236, and 238.

Flowchart 900 can conclude with routing, by first DDM node 222, second DDM node 226, and third DDM node 228, control and data information directly to one another so as to synchronously output external data 224 (action 990). Use of direct wireless links 232, 236, and 238, rather than AP 204, to provide such routing improves the accuracy of time synchronization protocols because the delays and jitter introduced by AP 204 can be avoided. As noted above, AP 204 typically introduces delays and jitter into network traffic that negatively impacts the accuracy and stability of synchronization algorithms and protocols. As a result, the performance of DDM wireless network 220 can be significantly better, due to use of direct wireless links 232, 236, and 238 for routing, than the performance of a time and phase synchronized network based on the infrastructure provided by AP 204.

For example, in implementations in which first DDM node 222, second DDM node 226, and third DDM node 228 are audio speakers, the audio latency resulting from use of direct wireless links 232, 236, and 238 for routing of control and data information may be as little as approximately twenty milliseconds (20 ms), compared to the conventional wireless network architecture shown in FIG. 1A and FIG. 1B, which may deliver one to two seconds of audio latency for the same use case and application.

Thus, the present application discloses DDM wireless networks in which node-to-node communication is achieved efficiently, using a substantially minimal amount of channel bandwidth, and resulting in significantly reduced network delay and jitter. The disclosed DDM wireless network architecture includes multiple DDM nodes, where each DDM node can discover and connect to other nodes in the network, and where connected DDM nodes are configured to route control and data information directly to each other. As a result, the DDM nodes can synchronously output external data received by the DDM wireless network from an external source.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. A system comprising:
a plurality of nodes configured for wireless communication, said plurality of nodes being configured to receive first external data from a first external source;
each of said plurality of nodes being configured to discover other nodes in said plurality of nodes;
each of said plurality of nodes being configured to store node specifications of said other nodes in said plurality of nodes, based on an authentication level mutually understood by said plurality of nodes;
each of said plurality of nodes being configured to run a time and phase tracking function to provide synchronization between said plurality of nodes;
wherein only one of said plurality of nodes at a time is selected to be a master node;
wherein said only one of said plurality of nodes selected to be said master node runs said time and phase tracking function to provide synchronization between said plurality of nodes;
wherein said only one of said plurality of nodes selected to be said master node is configured to be dynamically re-selected in response to a change in location of any of said plurality of nodes, in response to a change in location of said first external source, or in response to said plurality of nodes receiving second external data from a second external source;
each of said plurality of nodes routing control and data information directly to said other nodes in said plurality of nodes thereby synchronously outputting said first external data;
wherein said synchronously outputting said first external data includes presenting video content or audio content on a first node in said plurality of nodes, and providing haptic effects on a second node in said plurality of nodes, said haptic effects corresponding to said video content or to said audio content.

2. The system of claim 1, wherein an access point provides said first external data.

3. The system of claim 1, wherein the Internet provides said first external data.

4. The system of claim 1, wherein a network of remote servers provides said first external data.

5. The system of claim 1, wherein said first external data is provided wirelessly to said plurality of nodes.

6. The system of claim 1, wherein said first external data is provided by wire to said plurality of nodes at least one node.

7. The system of claim 1, wherein each of said plurality of nodes comprises an audio speaker.

8. The system of claim 1, wherein a music playback device connected by wire to said plurality of nodes provides said first external data.

9. The system of claim 1, wherein said wireless communication is performed via at least one of WiFi, Bluetooth, ZigBee, and 60 GHz wireless communications methods.

10. A method for use by a plurality of nodes configured for wireless communication, said plurality of nodes being configured to receive first external data from a first external source, and each of said plurality of nodes configured to run a time and phase tracking function to provide synchronization between said plurality of nodes, said method comprising:
discovering, by each of said plurality of nodes, other nodes in said plurality of nodes;
storing, by each of said plurality of nodes, node specifications of said other nodes in said plurality of nodes, based on an authentication level mutually understood by said plurality of nodes;
selecting, by said plurality of nodes, only one of said plurality of nodes at a time to be a master node;
running, by said only one of said plurality of nodes selected to be said master node, said time and phase tracking function to provide synchronization between said plurality of nodes;
dynamically re-selecting, by said plurality of nodes, said only one of said plurality of nodes selected to be said master node, in response to a change in location of any of said plurality of nodes, in response to a change in location of said first external source, or in response to said plurality of nodes receiving second external data from a second external source;
routing, by each of said plurality of nodes, control and data information directly to said other nodes in said plurality of nodes thereby synchronously outputting said first external data;
wherein said synchronously outputting said first external data includes presenting video content or audio content on a first node in said plurality of nodes, and providing haptic effects on a second node in said plurality of nodes, said haptic effects corresponding to said video content or to said audio content.

11. The method of claim 10, wherein an access point provides said first external data.

12. The method of claim 10, wherein the Internet provides said first external data.

13. The method of claim 10, wherein said first external data is provided wirelessly to said plurality of nodes.

14. The method of claim 10, wherein said first external data is provided by wire to said plurality of nodes.

15. The method of claim 10, wherein each of said plurality of nodes comprises an audio speaker.

16. The method of claim 15, wherein a music playback device connected by wire to said plurality of nodes provides said first external data.

17. The method of claim 10, wherein said wireless communication is performed via at least one of WiFi, Bluetooth, ZigBee, and 60 GHz wireless communications methods.

18. The system of claim 1, wherein a repeater node of said plurality of nodes serves as a repeater for a remote node of said plurality of nodes.

19. The method of claim 10, wherein a repeater node of said plurality of nodes serves as a repeater for a remote node of said plurality of nodes.

* * * * *

UNITED STATES PATENT AND TRADEMARK OFFICE
CERTIFICATE OF CORRECTION

PATENT NO. : 10,492,156 B2
APPLICATION NO. : 15/332188
DATED : November 26, 2019
INVENTOR(S) : Hooman Kashef et al.

Page 1 of 1

It is certified that error appears in the above-identified patent and that said Letters Patent is hereby corrected as shown below:

On the Title Page

Column 1, Item (73), "Assignee: INIZIO CAPITAL LLC, NEW YORK, NY (US)" should read
--Assignee: LIBRE WIRELESS TECHNOLOGIES, INC., Irvine, CA (US)--.

Signed and Sealed this
Tenth Day of May, 2022

Katherine Kelly Vidal
*Director of the United States Patent and Trademark Office*